United States Patent [19]

Kydd

[11] 4,111,604
[45] Sep. 5, 1978

[54] BUCKET TIP CONSTRUCTION FOR OPEN CIRCUIT LIQUID COOLED TURBINES

[75] Inventor: Paul H. Kydd, Lawrenceville, N.J.

[73] Assignee: General Electric Company, Schenectady, N.Y.

[21] Appl. No.: 704,349

[22] Filed: Jul. 12, 1976

[51] Int. Cl.² .............................................. F01D 5/18
[52] U.S. Cl. ................................... 416/97 R; 416/92
[58] Field of Search .......................... 416/92, 95–97; 415/115–116

[56] References Cited

U.S. PATENT DOCUMENTS

| 1,869,855 | 8/1932 | Le Grand | 416/96 X |
| 3,446,481 | 5/1969 | Kydd | 416/92 |
| 3,619,076 | 11/1971 | Kydd | 415/115 |
| 3,658,439 | 4/1972 | Kydd | 416/97 |
| 3,736,071 | 5/1973 | Kydd | 416/97 |
| 3,806,275 | 4/1974 | Aspinwall | 416/95 X |
| 3,816,022 | 6/1974 | Day | 416/92 |
| 3,848,307 | 11/1974 | Kydd | 416/96 X |

Primary Examiner—Everette A. Powell, Jr.
Attorney, Agent, or Firm—Richard G. Jackson; Joseph T. Cohen; Leo I. MaLossi

[57] ABSTRACT

An ultra-high temperature gas turbine bucket is shown with subsurface cooling channels extending from a bucket platform to a manifold in the tip region of the bucket. A liquid trap is disposed radially outward from the manifold and is in communication therewith, the trap under conditions of normal operation remaining filled with liquid coolant. A liquid coolant discharge orifice communicates with the trap at the blade tip generally adjacent the leading edge thereof. Liquid coolant substantially free of entrained vaporized coolant is discharged from the trap through the discharge orifice and collected in a collection slot in the turbine casing. Vaporized coolant is discharged from a nozzle disposed at the trailing edge of the bucket in communication with the manifold.

8 Claims, 4 Drawing Figures

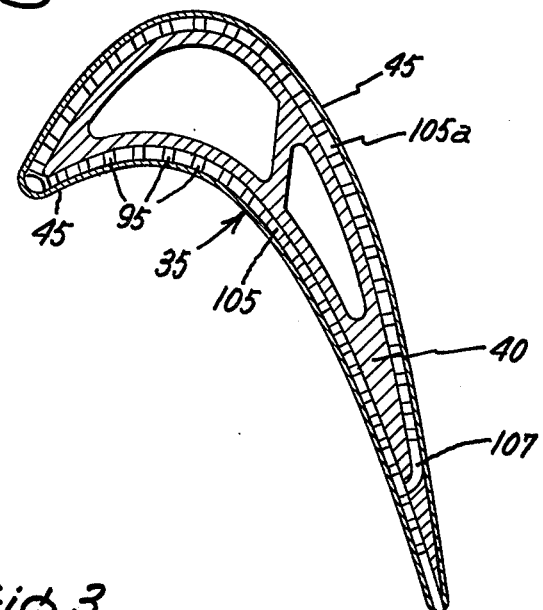
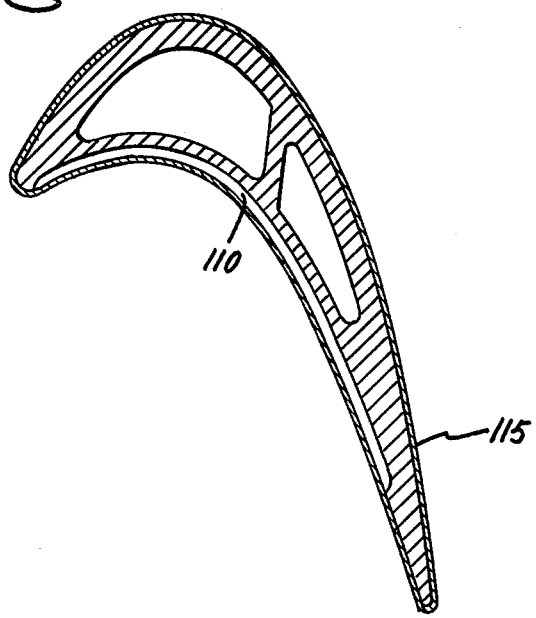

BUCKET TIP CONSTRUCTION FOR OPEN CIRCUIT LIQUID COOLED TURBINES

BACKGROUND OF THE INVENTION

1. Field of the Invention

This invention relates generally to a bucket tip construction for open circuit liquid cooled turbines and more specifically to an improved means for removing vaporized and liquid coolant from the turbine bucket tip.

2. Description of the Prior Art

Ultra-high temperature (UHT) gas turbines operate in a range from 2500° F. to 3500° F., providing as much as 200% more power and achieving as much as 50% greater thermal efficiency than conventional gas turbines. Materials and construction methods employed in the manufacture of such turbines dictate that the buckets thereof be provided with open circuit liquid cooling. Examples of open circuit liquid cooled turbine buckets are disclosed in U.S. Pat. Nos. 3,446,481 and 3,446,482 to Kydd and assigned to the assignee of the present invention.

Due to environmental considerations and the minimization of the requirement for make-up coolant, it has been the practice to recover as much liquid coolant which exits the bucket tip as possible. However, due to the high energy flow of motive fluid in an ultra-high temperature gas turbine, substantial amounts of liquid coolant may be discharged from the bucket and become entrained in the motive fluid flow. Should the liquid coolant become so entrained, impingement of the liquid coolant upon successive stages of turbine buckets can cause the erosion of the bucket airfoil surfaces thereby requiring accelerated maintenance and/or replacement of the buckets. Moreover, it has been found that the subsequent recirculation of liquid coolant through the buckets or the channeling of liquid coolant to the feed water input to a steam turbine is achieved more economically if liquid coolant with only minimal amounts of vaporized coolant entrained therein is recovered from the bucket than if the recovered liquid coolant has substantial quantities of vaporized coolant entrained therein.

As the liquid coolant flows through the gas turbine bucket, substantial quantities of the coolant are vaporized and, like the unvaporized coolant, are removed. It has been found that this removal of coolant from such a UHT bucket has associated therewith a certain amount of energy recoverable from the discharge of the vaporized coolant from the bucket. That is, if the coolant discharge is in a rearward direction relative to the direction of rotation of the bucket, the reaction force on the bucket from the coolant discharge stream adds energy to the rotating bucket thereby increasing its power output capability. Such schemes for the energy recovery of vaporized coolant discharged from the bucket are known as power augmenters, a suitable construction being disclosed and claimed in U.S. Pat. No. 3,816,022 to Day, incorporated herein by reference, and assigned to the assignee of the present invention. Therefore, it is desirable to retain the capabilities of power augmentation associated with UHT buckets while recovering the liquid coolant from the bucket tip.

Accordingly, it is an object of the present invention to provide a bucket tip construction for open circuit liquid cooled turbines wherein liquid and vaporized coolant are separately discharged from a particular bucket thereby increasing the efficiency of the recovery of liquid coolant.

It is another object of the present invention to provide a bucket tip construction for open circuit liquid cooled turbines whereby bucket erosion due to the entrainment of liquid coolant in the motive fluid after discharge from the bucket, is minimized.

It is another object of the present invention to provide a bucket tip construction for open circuit liquid cooled turbines wherein power augmentation is achieved from the discharge, from the bucket, of vaporized coolant relatively free of liquid coolant.

SUMMARY OF THE INVENTION

These and other objects apparent from the following detailed description taken in connection with the appended claims and accompanying drawings are attained by providing an ultra-high temperature gas turbine bucket with subsurface coolant channels extending from a bucket platform to a manifold in the tip region of the bucket and providing means in communication with the manifold for separately discharging the liquid and vapor components of the spent coolant from the coolant channels.

It will be understood that the terms "tip region" or "radially outer portion of the bucket" are intended to refer to the extremity of the bucket construction radially outward of the termination of the coolant channel(s) and will include shroud elements, when employed. It will be further understood that the term "manifold" as used herein indicates a chamber or other suitable structure in the tip region for collecting a plurality of flows.

A liquid trap is disposed radially outward from the manifold and is in communication therewith, the trap under conditions of normal operation remaining filled with liquid coolant. A liquid coolant discharge orifice shown located at the blade tip generally adjacent the leading edge thereof communicates with the trap. Liquid coolant substantially free of entrained vaporized coolant is discharged from the trap through the discharge orifice and collected in a collection slot in the turbine casing. The disposition of the discharge orifice at the tip of the bucket, allows the liquid coolant discharged from the bucket to be collected at the collection slot after traveling only a slight distance through the motive liquid thereby minimizing the entrainment of liquid coolant in the motive fluid and, thus, the possibilities of bucket erosion therefrom. Moreover, the disposition of the collection slot opposite the leading edge of the bucket where the pressure drop across the bucket is lowest, substantially reduces the risk of the motive fluid leaking around the bucket through the collection slot. The vaporized coolant is discharged from a nozzle disposed at the trailing edge of the bucket and in communication with the manifold.

The segregation of the liquid coolant in the trap from the vaporized coolant aids in the pressurization of the internal coolant within the passages by the vaporized coolant. This pressurization augments the power produced by the bucket and also increases the saturation temperature of the liquid coolant within the bucket thereby slightly raising the bucket skin temperature. This has the effect of both reducing heat losses within the bucket and reducing thermal stress in the bucket skin thereby increasing the useful life of the bucket skin.

BRIEF DESCRIPTION OF THE DRAWINGS

FIG. 2 is a sectional view taken on line 2—2 of FIG. 1.

FIG. 3 is a sectional view taken on line 3—3 of FIG. 1.

FIG. 4 is an alternate embodiment of the bucket tip construction of the present invention wherein a converging-diverging vapor discharge nozzle is employed.

DESCRIPTION OF THE PREFERRED EMBODIMENT

Figure 1:
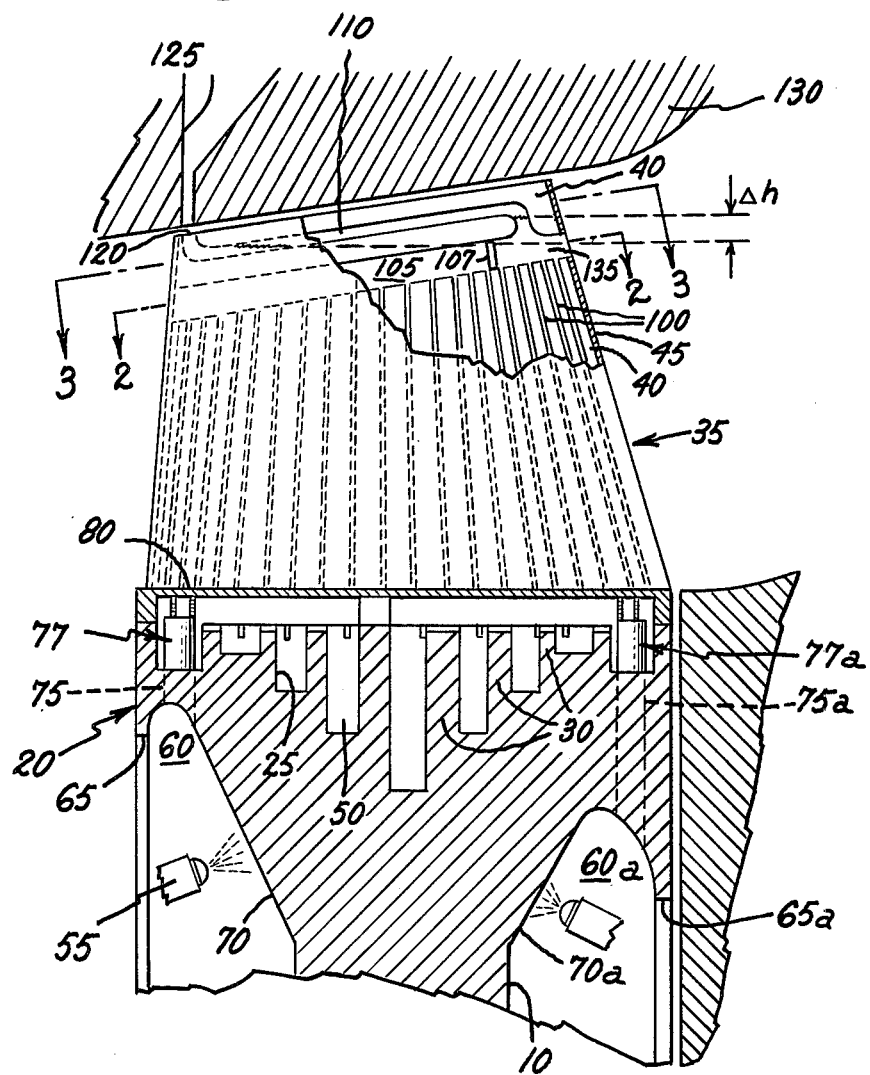
FIG. 1 is a transverse sectional view showing a gas turbine rotor disc rim and a liquid cooled turbine bucket employing the bucket tip construction of the present invention.

Referring generally to FIGS. 1, 2 and 3, a turbine wheel or disc 10 including a rim portion 20 is provided with grooves 25 defined by a series of radially extending axially spaced ribs 30. A turbine bucket 35 includes a central core 40 and an overlying outer skin 45 having an aerodynmamic shape as best illustrated in FIGS. 2 and 3. The bucket skin and core in the preferred embodiment are fabricated from steel alloys and contain approximately 12% by weight of chromium for corrosion resistance. The skin and core are heat treatable and are, therefore, of a high strength. Turbine bucket 35 also includes finger-like projections or tines 50 which are received within grooves 25 and are brazed to the sides and bottoms of the grooves for the firm mounting of the bucket to the disc. This mounting arrangement forms no part of the present invention and it will be understood that alternate mounting arrangements such as a dovetail construction disclosed in U.S. Pat. Nos. 3,844,679 and 3,856,433 to Grondahl et al., incorporated herein by reference and assigned to the assignee of the present invention may be employed.

To provide for the entrance of liquid coolant from suitable sprayers one of which is shown at 55, to the bucket tip construction of the present invention, disc 10 is provided with gutters 60 and 60a which are partially defined by downwardly extending lip portions 65 and 65a. Under normal operation, water or another suitable liquid coolant is sprayed onto surfaces 70 and 70a of gutters 60 and 60a, respectively, by the sprayers and accumulates in the gutters until it has been accelerated to the velocity of the disc rim. After being so accelerated the coolant drains radially outwardly through supply tubes 75 and 75a disposed on opposite sides of disc 10 and forming portions of coolant traps 77 and 77a. Through suitable cooling channels (not shown) the coolant is distributed from supply tubes 75 and 75a and traps 77 and 77a and metered into bucket 35. Suitable constructions for the metering of coolant to the bucket are disclosed and claimed in U.S. Pat. Nos. 3,804,551 to Moore and 3,844,679 to Grondahl et al., both incorporated herein and assigned to the assignee of the present invention.

Coolant so metered to bucket 35 enters radially extending cooling channels 95 defined by grooves 100 machined in core 40 and skin 45. It should be noted that cooling channels 95 need not be straight passages as shown but may be of a serpentine configuration as disclosed in the aforementioned U.S. Pat. No. 3,844,679. The radially outer ends of cooling channels 95 terminate in a first duct or manifold 105 defined by a slot formed in core 40 and by skin 45. On the suction side of bucket 35, a manifold 105a also communicates with the radially outward ends of cooling channels 95 and is defined by skin 45 and a slot formed in the suction side of core 40. Manifolds 105 and 105a communicate with each other through passage 107. (See FIG. 2).

To provide for the segregation of liquid coolant from vaporized coolant within bucket 35, a second (branched) duct or liquid trap 110 is provided at the tip portion of bucket 35 and is defined by skin 45 and a slot formed in core 40. A liquid discharge orifice 120 communicates with the liquid trap at the leading edge of the bucket tip. A liquid collection slot 125 is provided in casing 130 and disposed in alignment with liquid discharge orifice 120, the collection slot receiving the liquid coolant discharged from orifice 120 for the collection and recirculation thereof. The liquid collected in slot 125 may also be fed into the feed water input to a steam turbine.

As the coolant flows through channels 95, some of the coolant is vaporized. Due to the difference in density between the vaporized and the liquid coolant leaving the cooling channels, centrifugal force causes the liquid coolant to collect in trap 110, the pressure of the vaporized coolant aiding in the discharge of the liquid coolant through orifice 120 as evidenced by the difference $\Delta h$ in the liquid coolant levels within the trap. Once a given set of operating conditions has been established, as liquid coolant enters the trap from manifold 105, the same amount is forced out of the other end of the trap via orifice 120. The liquid coolant collected in trap 110 blocks the passage of vaporized coolant to the trap and forces the vaporized coolant to be discharged separately from the bucket in a manner to be described.

The pressure drop across (between the pressure and suction sides) a turbine bucket such as that shown in FIG. 1 is at a minimum value at the leading edge thereof. Therefore, by locating discharge orifice 120 at the leading edge of the bucket, slot 125 is located where the amount of motive fluid which will leak across the bucket tip is minimized. Moreover, the amount of liquid coolant becoming entrained in the motive fluid is also minimized since the discharged liquid coolant travels only an insubstantial distance between the bucket tip and collection slot after discharge. Since the amount of liquid coolant which could become entrained in the motive fluid stream is minimized, the erosive effects of such liquid on successive turbine buckets is also minimized thereby increasing the useful life of these components. Furthermore, since the trap in the tip region effectively segregates the liquid coolant from the vaporized coolant, the coolant collected at slot 125 is relatively free from vaporized coolant. Therefore, the liquid coolant so collected may be recirculated for cooling purposes or fed to a steam turbine feedwater system in an economical manner.

To provide an outlet for the coolant which is vaporized within bucket 35, a vapor discharge nozzle 135 is disposed in line and communicating with the manifold 105 at the trailing edge of bucket 35. As will be appreciated, locating vapor discharge nozzle 135 in this area enables the vaporized coolant discharged therefrom to augement the power output of turbine bucket 35. However, it will be understood that the vaporized coolant may be discharged in other directions, such as radially inward, to cool other turbine components such as the bucket root while still providing for the separate, optimal discharge of liquid coolant. Furthermore, since the liquid coolant is segregated from the vaporized coolant within trap 110, the cooling passages are pressurized.

This has the effect of augmenting the power produced by the turbine bucket and increasing the saturation temperature of the liquid coolant. Therefore, the temperature of the bucket skin is raised slightly, thereby reducing heat losses from the motive fluid to the bucket and thus reducing the thermal gradients within the bucket skin. By reducing the thermal gradients within the skin, the thermal stresses within the skin are decreased in magnitude and the useful life of the bucket itself is extended.

FIG. 4 illustrates a modified form of a vapor discharge nozzle. In FIG. 4, vapor discharge nozzle 140 is of the converging-diverging type similar to that disclosed and claimed in the aforementioned Day patent. Such a nozzle, makes possible a supersonic flow of vaporized coolant from the gas turbine bucket thereby further increasing the power augmentation due to the discharge of the vaporized coolant from the bucket. Employing such a converging-diverging type vapor discharge nozzle will necessarily require one or more of cooling channel grooves 100 to merge with adjacent grooves in order to accommodate the convergent-divergent nozzle and conduct coolant to the manifold 105 employed therewith.

Therefore, it can be seen that the bucket tip construction of the present invention allows liquid coolant to be segregated from vaporized coolant, coolant in these two phases being separately discharged from the bucket at optimal locations with increased effectiveness of operation.

While the bucket tip construction of the present invention has been shown with no shroud, it will be appreciated that this construction may be effectively employed in a shrouded turbine bucket. In such a design, cooling channels 95 may be extended into the shroud element which itself may be provided, for example, with a serpentine arrangement of internal cooling channels. In this design the coolant would flow through the cooling channels in the airfoil portion of the bucket, through the cooling channels in the shroud, and into a suitable manifold structure located within the shroud where the liquid component of the coolant would be separated from the vaporized component and enter a liquid trap. A discharge orifice disposed at the shroud element tip and communicating with the trap would serve as a means for discharging liquid coolant from the bucket while the vaporized coolant could be similarly discharged from a suitable discharge nozzle.

While there has been shown and described a specific embodiment of the bucket tip construction of the present invention, it will be apparent to those skilled in the art that modifications may be made without departing from the substance of this invention and it is intended by the appended claims to cover such modifications as come within the spirit and scope of this invention.

What is claimed is:

1. In a gas turbine wherein a turbine disc is mounted on a shaft rotatably supported in a casing, said turbine disc extending substantially perpendicular to the axis of said shaft and having turbine buckets affixed to the outer rim thereof with platform means disposed therebetween, said buckets receiving a driving force from a hot motive fluid moving in a direction generally parallel to said axis of said shaft and the driving force being transmitted to said shaft via rotation of said turbine disc, means located radially inward of said platform for introducing liquid coolant within said turbine in a radially outward direction into an open circuit coolant distribution system comprising cooling channels extending beneath the airfoil surfaces of each of said buckets and a manifold located in the tip region of each of said buckets in flow communication with the radially outer ends of cooling channels of the given bucket whereby coolant enters into, proceeds through and exits from cooling channels into said manifold, the improvement comprising:
(a) a liquid trap disposed in the tip region of said bucket radially outward from and in communication with said manifold;
(b) an orifice disposed at the tip of said bucket in communication with said liquid trap for the discharge of liquid coolant from said manifold in a radially outward direction; and
(c) conduit means disposed in communication with said manifold to accommodate vapor coolant flow therefrom.

2. The improvement of claim 1 wherein:
said manifold comprises slots formed in the bucket core on both suction and pressure side thereof, said slots communicating by a passage extending through the core;
said liquid trap comprises a single slot formed in said bucket core and
said conduit means comprises a nozzle whereby vaporized coolant is discharged from the trailing edge of said bucket.

3. The improvement of claim 2, wherein said nozzle is of the convergent-divergent type.

4. The improvement of claim 1, wherein said liquid discharge orifice is disposed generally at the leading edge of said bucket.

5. In a liquid cooled turbine bucket of the type including a core, a skin overlying said core and presenting an aerodynamic surface to a flow of motive fluid, and a network of open-ended cooling channels disposed below said skin, the improvement comprising:
a first duct disposed transverse to and communicating with the radially outer ends of said cooling channels, said first duct extending from the leading to the trailing edge of said bucket beneath the surface of said bucket on both suction and pressure sides thereof;
a coolant vapor discharge nozzle communicating with said first duct at the trailing end thereof;
a second duct disposed generally parallel to and radially outward from said first duct and extending from the leading to the trailing edge of said bucket beneath the surface of said bucket, said second duct being branched at the leading and trailing ends thereof, the trailing end branch providing communication with said first duct and
a liquid coolant discharge orifice disposed adjacent the bucket tip at the leading edge thereof and communicating with said second duct via the leading edge branch of said second duct.

6. A liquid coolant turbine bucket comprising:
(a) a core;
(b) a skin overlying said core and presenting an aerodynamic surface to a flow of motive fluid;
(c) a network of subsurface cooling channels disposed below said skin;
(d) a manifold disposed below said skin and in fluid communication with the radially outward ends of said cooling channels;

(e) a liquid trap disposed in the tip region of said bucket radially outward from and communicating with said manifold;

(f) a liquid discharge orifice disposed adjacent the leading edge of the tip of said bucket and in communication with said liquid trap, liquid coolant being discharged through said discharge orifice from said liquid trap and said manifold; and (g) a vapor discharge nozzle disposed in communication with said manifold, vaporized coolant being discharged through said vapor discharge nozzle from said manifold in a rearward direction relative to the direction in which said turbine bucket is intended to move.

7. The turbine bucket of claim 6, wherein the vapor discharge nozzle is of the convergent-divergent type.

8. In the operation of a gas turbine wherein a turbine disc is mounted on a shaft rotatably supported in a casing, said turbine disc extending substantially perpendicular to the axis of said shaft and having turbine buckets affixed to the outer rim thereof with platform means disposed therebetween, said buckets receiving a driving force from a hot motive fluid moving in a direction generally parallel to said axis of said shaft and the driving force being transmitted to said shaft via rotation of said turbine disc, means located radially inward of said platform for introducing liquid coolant within said turbine in a radially outward direction into an open-circuit coolant distribution system by which said coolant proceeds as liquid and vapor through cooling channels and exits from said channels into manifold and discharge means forming part of said open-circuit coolant distribution system, the improvement comprising:

(a) providing a liquid reservoir between liquid coolant and vaporized coolant within the bucket in the tip region thereof;

(b) collecting liquid coolant in said reservoir;

(c) separating liquid coolant from vaporized coolant within said tip region;

(d) discharging the so separated liquid coolant substantially free of vaporized coolant from the tip region through an orifice in a radially outward direction; and (e) discharging the so separated vaporized coolant from the bucket through a nozzle in a rearward direction of rotation of said turbine bucket.

* * * * *